United States Patent [19]

Sims

[11] 4,157,188
[45] Jun. 5, 1979

[54] TAG AXLE SUPPORT FOR CONCRETE MIXER UNITS

[76] Inventor: Royal W. Sims, 6451 Holladay Blvd., Salt Lake City, Utah 84121

[21] Appl. No.: 805,887

[22] Filed: Jun. 13, 1977

[51] Int. Cl.² ............................................ B60G 17/00
[52] U.S. Cl. ................................ 280/81 R; 280/43.23; 280/704
[58] Field of Search ............ 280/81 R, 81 A, 702–706, 280/711–713, 688, 689, 112 R, 112 A, 43.23, 157; 267/20 R, 64 B; 105/215 C

[56] References Cited

U.S. PATENT DOCUMENTS

| | | | |
|---|---|---|---|
| 2,771,304 | 11/1956 | LaPere | 280/157 X |
| 2,859,949 | 11/1958 | Willard | 366/44 |
| 3,019,002 | 1/1962 | Prichard | 280/81 R X |
| 3,111,335 | 11/1963 | Hickman | 267/20 R X |
| 3,286,657 | 11/1966 | Browne | 280/704 X |
| 3,694,001 | 9/1972 | McGee | 280/712 |
| 3,704,896 | 12/1972 | Buelow | 280/43.23 X |
| 3,713,663 | 1/1973 | Granning | 280/112 R |
| 4,082,305 | 4/1978 | Allison et al. | 280/704 X |

*Primary Examiner*—Joseph F. Peters, Jr.
*Assistant Examiner*—R. Schrecengost
*Attorney, Agent, or Firm*—John A. Young

[57] ABSTRACT

A tag axle is mounted to the frame at the rear of a vehicle on an articulated linkage which extends downwardly and rearwardly. Springs bias the tag axle and its bearing-supported wheels in an upward direction. The tag axle is actuated downwardly by two air bags, one at each end of the tag axle. The tag axle provides vertical support at the rear of the vehicle through the air bag actuators. The tag axle is guided vertically by means of two upright arms, one at each side of the frame, and including anti-friction roller bearings and associated tracks which permit free vertical movement of the tag axle but prohibit lateral and torsional, and limit differentially vertical, movement of the wheels. A greater vertical movement of the tag axle is permitted because of the location and disposition of the tag axle and associated components, thereby preventing ground-bottoming or ploughing by any component at the rear portion of the vehicle. The total package is lighter and more compact to reduce weight and cost.

4 Claims, 4 Drawing Figures

TAG AXLE SUPPORT FOR CONCRETE MIXER UNITS

BACKGROUND OF THE INVENTION

Tag axles are known in the art and are used as an expedient for reducing the per-axle load in a vehicle. Generally, when a vehicle is loaded, whether it be a dump truck, concrete mixer truck, or other load-carrying vehicle, the axle weight can be increased beyond that permissible for over-the-highway travel. This can result in damage to the highway and the truck and can create a hazard to the operator of an overloaded vehicle. A tag axle can be used to further distribute the vehicle and payload weight. The tag axle is loaded to relieve the other axles, and to that extent the load is relieved on the remaining axles, the per-axle weight is brought within that permitted by the various state laws for over-the-highway travel.

Unfortunately, tag axles in present use tend to be cumbersome and ineffective. Existing tag axles are mounted in such a way that when the wheels are moved downwardly into ground engagements, the limits of vertical movement of the tag axle are so limited that, in many cases, when the vehicle is moving under uneven terrain the tag axle bottoms out on the frame, and weight is lifted off the rear axles and tandem axles and transferred excessively onto the tag axle causing the tag axle wheels to dig into the ground. This is called "ploughing", and is an inherent result of many of the presently used tag axles because there is insufficient vertical movement for the tag axle before bottoming out on the frame.

Moreover, the air brakes and other associated power equipment for operating the air brakes are mounted in such a way on the tag axle as to interfere with normal and expected operation of the tag axle. In supporting the tag axle so that it can move vertically to cushion the load at the rear of the vehicle it is common present practice to use the large, weight-contributing structures which tend to limit normal operation of the tag axle.

In the present invention the purpose is to eliminate the previously used constructions which consisted of large centering guides, cross braces and blocks for guiding the wheels, as well as the inapt location of the air brake power actuation equipment, and substitute in its place a much simpler, cleaner construction in which the tag axle is supported and guided laterally by means of elevated guide means located one at each side of the frame and having rollers which engage in tracks or other bearing structures. In this way, the primary object of the invention is achieved, which is to permit minimized unsprung tag axle weight and a construction that avoids ploughing, i.e., digging into the ground when the vehicle is moved over irregular terrain and in which the components are more protected and less obstructive to normal vertical movement of the tag axle.

However, the means for guiding the wheels is greatly improved in that the wheels are permitted to move freely in a vertical sense, and one wheel can even move in a limited vertical sense relative to the other, to provide for normal encountering with chuck holes, potholes, and the like. At the same time, the wheels are prevented from moving laterally back and forth sidewise of the frame, and one wheel is prevented from advancing relative to the other along the length of the frame. Thus, the tag axle is prevented from pivoting about a vertical axis but can move perpendicularly, to allow for normal cushioning of the vehicle. But lateral movement of the wheels, i.e. movement horizontally to the frame, either side to side at the frame, or front to back of the frame, is totally prevented.

Each of the wheels includes a fender, and the fenders are braced for vertical movement with the wheel, the bracing being accomplished also through the tag axle.

It is possible, therefore, with existing vehicle structure, to take what is a commonly available tag axle, invert its normal position, weld to the existing frame a downwardly and rearwardly projected leverage system for supporting the tag axle, and then suspend the tag axle in a normally retracted position by means of springs located one on each side of the rails of the frame. Each side of the axle is then actuated by an associated air bag to effect downward movement of the wheels (rotatably supported on the tag axle) into ground engagement and thereby to distribute the vehicle load.

Other objects and features of the present invention will become apparent from a consideration of the following description, which proceeds with reference to the accompanying drawings.

DRAWINGS

DETAILED DESCRIPTION OF THE INVENTION

Figure 1:
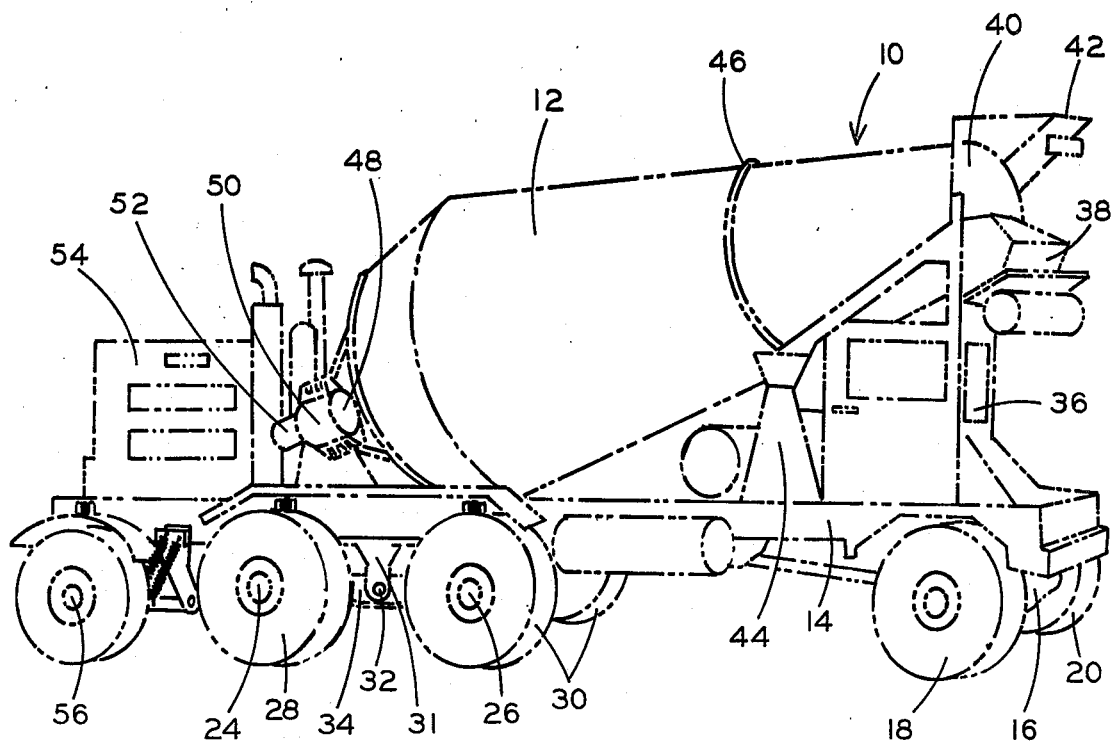
FIG. 1 is an isometric view of a front discharge concrete mixer unit having the present invention installed thereon.

Referring to FIG. 1, a vehicle designated generally by reference numeral 10, consists of a front discharge concrete mixer unit described in complete detail in several issued patents, one of the principal ones of which is the now expired J. Jack Willard U.S. Pat. No. 2,859,949, issued Nov. 11, 1958, entitled "FORWARD DISCHARGING TRANSIT CONCRETE MIXER."

Briefly, the front discharge mixer truck 10 consists of a bowl 12 which is mounted on a frame 14 and having a front axle 16 with ground engaging wheels 18,20 and tandem axles 24,26 each having a pair of wheels 28 and 30. Connecting the frame 14 to the tandem axles is a tandem axle support flange 31 and a pivot 32 for an axle beam 34. Stub axles (not shown) project from opposite ends of beam 34 to provide the anti-friction bearings on which are mounted the respective pairs of wheels 28,30.

At the front end of the vehicle 10 is a cab 36 and an extendable chute 38. Concrete, at the time of discharge, emerges from the forward open end 40 of the bowl 12 and is discharged into a hopper 42 with a discharge opening directed into the chute 38. The bowl is supported by means of stanchion 44 having rollers which engage a bearing collar 46 on the drum to rotatably support the forward end of the drum and the rear portion of the drum is rotatably driven and supported by a rear stanchion 48. The drum is rotated by means of a chain or gear arrangement, the particular arrangement shown herein consisting of a gear box 50 and transmission 52 which is driven by a power takeoff from engine 54.

Figure 2:
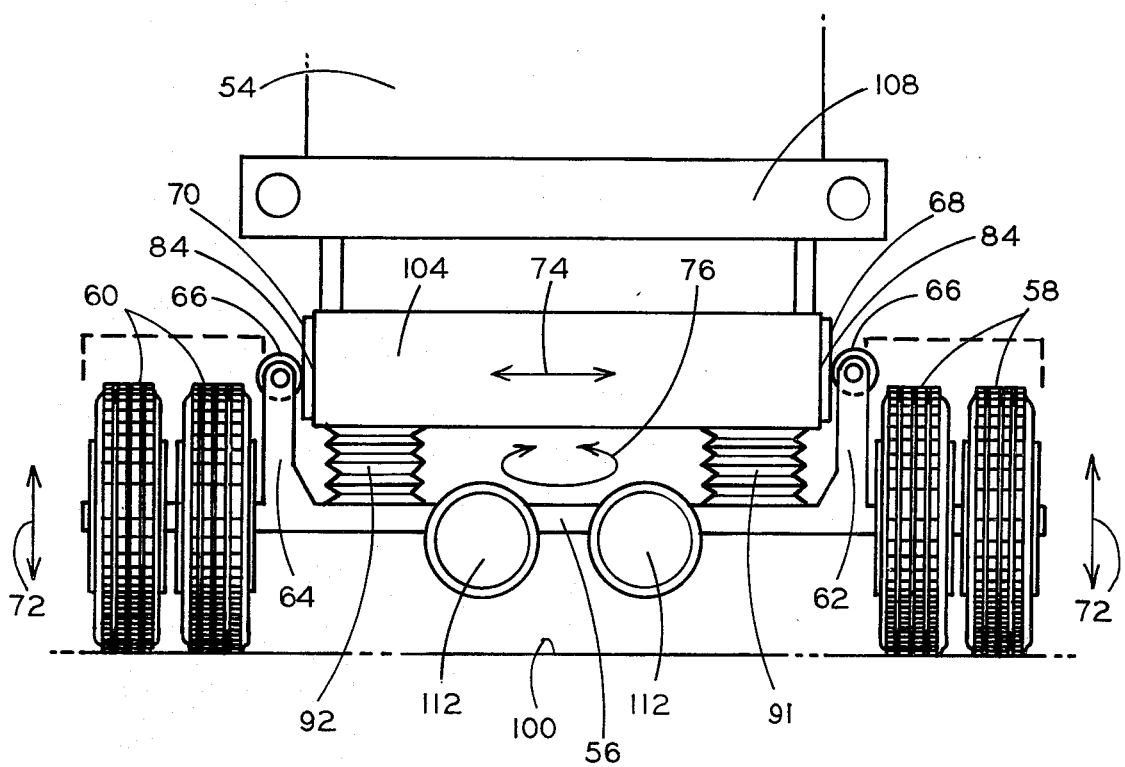
FIG. 2 is a rear view looking from the rear of the vehicle and illustrating details of the tag axle construction.
Figure 3:
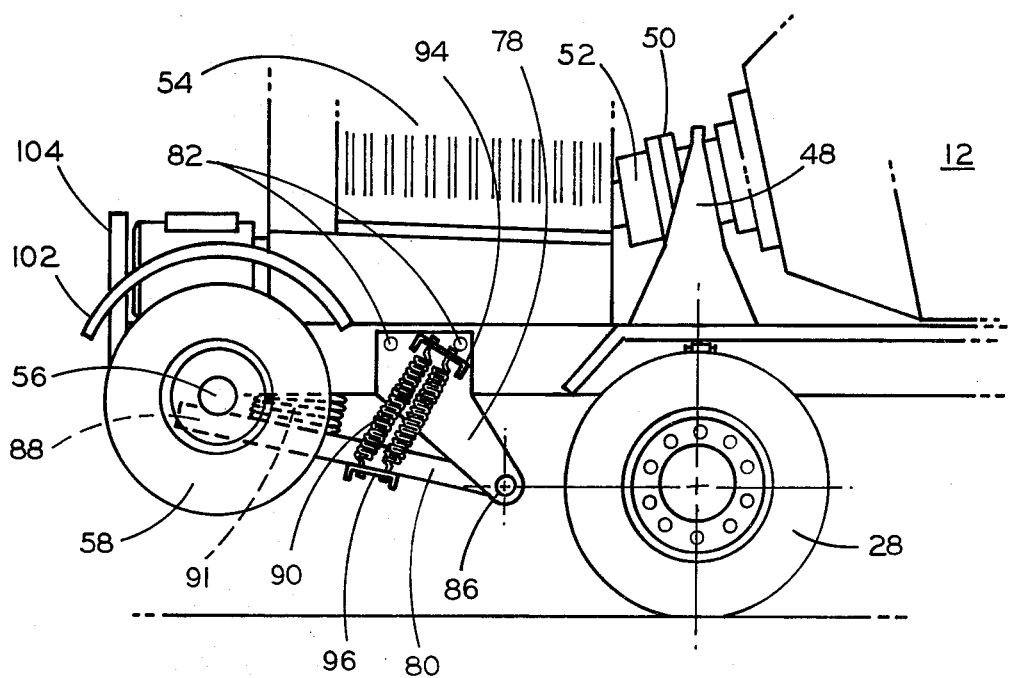
FIG. 3 is an enlarged detail view illustrating the tag axle in retracted position; and, FIG. 4 is a view similar to FIG. 3, but illustrating the tag axle in its operation position.
Figure 4:
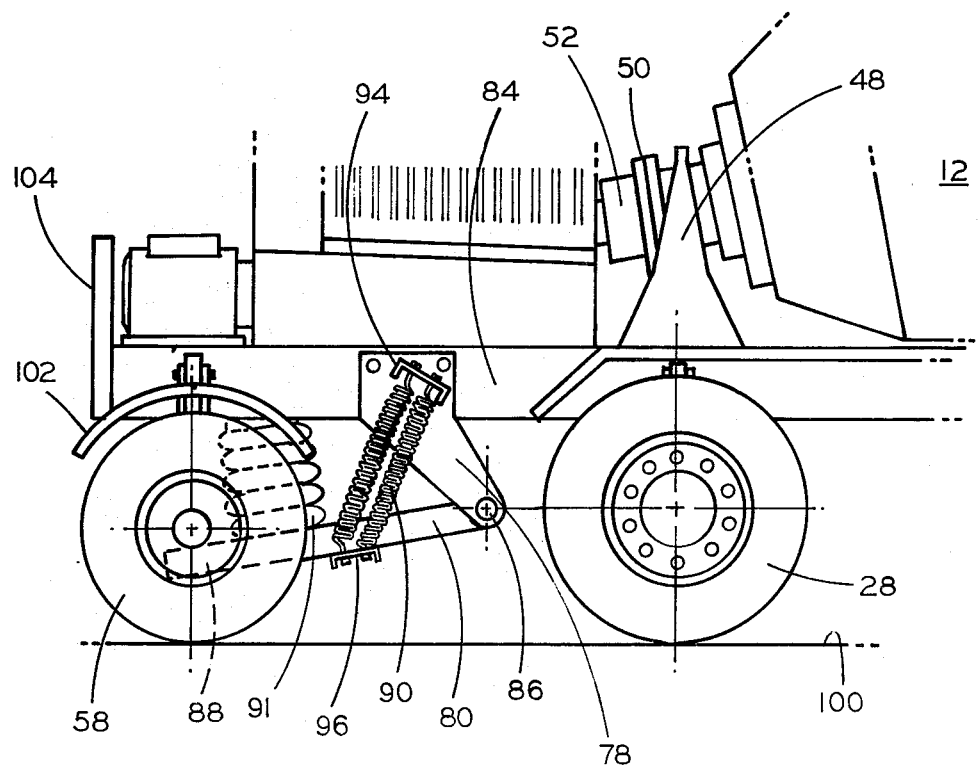

Referring now to FIGS. 2, 3, and 4, there is shown a tag axle 56 having a pair of wheels 58 and 60, one pair at each of opposite ends of the tag axle. Tag axle 56 also includes two upright arms 62,64, each having an anti-friction roller bearing 66 in operative slideable engagement with bearing surfaces 68,70 secured to frame 14 so that tag axle 56 can move in a vertically upward and downward direction indicated by double arrow headed line 72. At the same time, the tag axle is prevented from moving in a horizontal direction indicated by the double arrow headed line 74 (FIG. 2) and the axle is prevented from moving in either direction indicated by double arrow headed line 76 about a vertical axis. Slight movement is permitted in a vertical sense by the right-hand pair of wheels 58 relatively to the left-hand pair 60 to compensate for chuck holes and the like so that the truck will not be caused to tilt as it moves over rougher terrain. This relative vertical movement is, however, quite slight and limited in its nature.

Referring to FIGS. 2, 3, and 4, the tag axle 56 is supported on a pair of articulated arms 78 and 80, 78 being secured by rivets 82 or the like to framerail 84 and arm 80 having pivot connection to 86. The tag axle 56 is supported at end 88 of arm 80 which is biased to the upward or raised position indicated in FIG. 3 by a pair of springs 90 which are stretched between a channel 94 secured to arm 78 and a second channel 96 operatively secured to the underside of lever 80. Thus, the tag axle is held in a raised position, FIG. 3, until one of a pair of air-actuated bellows, or air bags 91, 92 is energized to lower the wheel sets 58,60 into engagement with ground 100 (FIG. 4). Each wheel of the pairs of wheels 58 has a fender section 102 which is operatively secured to its associated upright arm 62,64 (FIG. 2).

As viewed in FIG. 2, the side rails 84 of the frame are fastened together by means of a cross-brace 104 which is disposed just to the rear of rear-mounted engine 54.

Above the level of the cross-brake 104 is a rear bumper 108.

One of the important advantages of the present invention is that the tag axle 56 can move up or down in the direction indicated by the double headed arrow line 72 in FIG. 2 and without interfering with any of the existing structure of the vehicle. Thus, the cylinders 112 which are the power cylinders for operating the brakes (not shown) associated with the pairs of wheels 58,60, can be disposed at a lower level on the tag axle 56 which is inverted (in a vertical sense) from the conventionally mounted tag axles so that the tag axle and its associated equipment can move upwardly and downwardly through a substantial distance and without interfering or engaging with surrounding truck structure. The tag axle 56 can move up and down under high loads; while the vehicle is going up inclines, the tag axle 56 is enabled to move upwardly sufficiently and without coming into contact with the chassis of the truck so that no part of the truck weight is transferred off wheels 28,30 and onto wheels 58,60. This avoids the "ploughing" effect common in previously employed tag axle arrangements.

The air bags 91,92 permit the pairs of wheels to move up and down in a vertical sense (line 72) and such movement is permitted because the wheels 66 have anti-friction roller bearing against the opposed bearing surfaces 68,70 of guide plates secured to rails 84. Thus, the wheels are efficiently guided in a vertical sense permitting shock absorbing vertical movement, but the wheels are prevented from moving in a lateral sense indicated by line 74 in FIG. 2 or rotating about a vertical axis (line 76, FIG. 2). One set of wheels 58 can move to a slight extent relative to the other set of wheels 60 to compensate for chuck holes and depressions while the other is on level ground, thus permitting the slight movement of one set of wheels relative to the other. Consequently, the truck does not tend to tip. It should be borne in mind, however, that this relative vertical movement of one set of wheels over the other is slight, in the order of only 3 or 4 inches or so.

OPERATION

In operation, the vehicle 10 is loaded with concrete, the charge being received in rotatable bowl or drum 12 and the driver of the vehicle then proceeds to the building site where the concrete is to be discharged. In transit, the bowl continuously rotates at a slow but controllable speed in order to keep the concrete from "setting up," and maintaining a substantially constant slump value for the load.

Should the load on front axle 16 and tandem axles 24,26 be excessive so as to approach the upper limit of permissible axle loading or upper limit determined by so-called "bridging" law, then the tag axle 56 is actuated to relieve some of the load on these other three axles, this being accomplished by energizing or actuating the air bags 91,92. When the air bags 91,92 are inflated to the desired extent, the arm 80 is pivoted downwardly about 86, bringing the tag axle 56 and wheels 58,60 in a downward direction and causing the wheels 58,60 to come into ground support 100 at which time a part of the load of the vehicle is transferred onto the tag axle 56 and correspondingly relieving at least some of the load on the remaining axles 16,24,26. In this way, the per-axle loading of 16,24,26 is relieved, thus making the load manageable and within the axle-loading limitations prescribed by state law for over-the-highway vehicle transit of the load.

Movement of the tag axle is permitted in a vertical sense, but other movements of the tax axle, either in a horizontal sense (indicated by double arrow headed line 74) or torsional sense (indicated by the arrows 76) is prohibited by means of the anti-friction wheels 66 which are carried by arms 62,64 and secured to the tag axle 56. Movement of the anti-friction wheels 66 on the opposed bearing surfaces 68,70 precludes movement of the wheels except in a vertical sense, while permitting only slight differential vertical movement of each set of wheels 58,60 at the opposite sides of the truck.

Because there are no obstructing sections of the frame, rear bumpers, and other such support components by reason of the unique construction and placement of the tag axle 56, such tag axle 56 can move through a greater vertical extent, and avoid obstructions and bottoming out relative to the frame. This permits a movement through a substantial vertical extent, and by avoiding bottoming out of the tag axle on the frame because of the unique "inverted" positioning of the axle relative to the frame, there is no transfer of excess vehicle loads onto the tag axle such as would normally occur should bottoming out take place while the vehicle is going on an incline. Whenever the tag axle does bottom out on the frame, the rear axle wheels are sometimes literally raised off the ground, and thus all of the weight of the vehicle is borne by the front axle and the tandem axle. This result is entirely obviated in the present invention because of the unique inverted or "upside down" placement of the tag axle so that neither the brake actuator components, the axle itself, or any of the associated structure is likely to come into engagement with the frame. The length of arms 62,64 multiplies the resisting torque of bearings 66 to inadvertent and unwanted movement of the tag axle 56 except in its prescribed vertical movement. The efficiency of such arrangement over the previous gripping of tag axle 56 is apparent. There is less opportunity, or, more correctly, no opportunity for the mounting, shock absorbing, or other truck related tag axle structure to come into engagement with the frame, or interfere with the desired scope of vertical movement required for proper tag axle operation.

When the pressure in air bags 90,91,92 is relieved, the springs 90 retract the tag axle 56 and associated wheels 58,60, causing them to raise vertically to the position shown in FIG. 3. The fenders 102 for the wheels, being attached one to each of the arms 62,64 is likewise raised to transport position. Altogether, the improvement obtained results in a more economical tag axle construction because of the greatly reduced weight at the cantilevered end of the truck: the tag axle 56 can move through a greater vertical scope and without having any of the associated structure come into engagement with the ground 100 or other vehicle components. More efficient guidance is provided and at a higher level, making it more efficient by increasing the lever arm for the guidance roller 66 (note the substantial length from the center line of the tag axle 56 to the point of engagement between roller 66 with the opposed bearing surfaces 68,70, in FIG. 2), and consequently the guidance is more precise and appropriate to the type of movement expected from the tag axle 56.

Although the present invention has been illustrated and described in connection with a few example embodiments, it will be understood that these are illustrative of the invention and are by no means restrictive thereof. It is reasonably to be expected that those skilled in this art can make numerous revisions and adaptations of the invention, and it is intended that such revisions and adaptations will be included within the scope of the following claims.

What is claimed is:

1. In a vehicle having a front support axle with steerable wheels and intermediate load bearing tandem axles including ground-engaging wheels, a tag axle at the rearmost part of said vehicle, ground-engaging wheels rotatably supported at opposite ends of said tag axle, a vehicle frame extending rearwardly of said tandem axle support wheels and including depending portions one at each side of said frame and adapted to support said tag axle, downwardly and rearwardly inclined support arms mounted for arcuate movement on said depending portions and adapted to receive said tag axle, resilient means for biasing said wheels and tag axle in a pivotally upwardly directed movement and out of ground supporting engagement, tag axle guide means, secured to opposite lateral sides of said tag axle, anti-friction bearing means operatively secured to said guide means operatively engaging said vehicle frame to limit movement of said tag axle essentially to vertically upward and downward movement to bring the associated wheel into-and-out-of ground engagement, and prohibiting lateral movement relative to said frame and twisting movement relative to said frame about a vertical axis, and an expandable power actuating means for effecting movement of said wheels carried by the tag axle downwardly into ground engagement and against the resistance of said resilient means.

2. The tag axle construction in accordance with claim 1 including fender means surrounding a portion of each of said wheels, and mounting means for said fenders operatively carried by said tag axle for vertical movement of said fenders with said wheels.

3. The tag axle construction in accordance with claim 1 in which said power actuating means for effecting ground engagement consists of an air bag one for each of said wheels at opposite ends of said tag axle and acting against said frame and tag axle respectively.

4. The tag axle structure in accordance with claim 1, including power cylinders for air brakes, one associated with each of said set of wheels and carried by said tag axle and movable vertically with said tag axle in noninterfering relation with said frame.

* * * * *